United States Patent [19]

Haack

[11] Patent Number: 4,687,590
[45] Date of Patent: Aug. 18, 1987

[54] OIL-IN-ALCOHOL MICROEMULSION CONTAINING OIL-SOLUBLE CORROSION INHIBITOR IN ANTIFREEZE

[75] Inventor: John L. Haack, Tarrytown, N.Y.

[73] Assignee: First Brands Corporation, Danbury, Conn.

[21] Appl. No.: 793,847

[22] Filed: Nov. 1, 1985

[51] Int. Cl.$^4$ ................................................ C09K 5/00
[52] U.S. Cl. ........................................ 252/75; 252/73; 252/77; 252/78.5; 252/308; 252/312
[58] Field of Search .................... 252/73, 75, 77, 78.5, 252/308, 312

[56] References Cited

U.S. PATENT DOCUMENTS

| | | | |
|---|---|---|---|
| 3,629,119 | 12/1971 | Weaver | 252/77 |
| 3,791,803 | 2/1974 | Andress, Jr. et al. | 252/77 |
| 3,903,005 | 9/1975 | kablaoui et al. | 252/77 |
| 4,337,161 | 6/1982 | Stayner | 252/49.5 |
| 4,371,447 | 2/1983 | Webb et al. | 252/73 |

OTHER PUBLICATIONS

I. D. Robb, *Microemulsions*, Plenum Press (1981).
L. M. Prince, *Microemulsions Theory and Practice*, Academic Press (1977).

Primary Examiner—Robert A. Wax
Attorney, Agent, or Firm—Gary L. Wamer

[57] ABSTRACT

Oil-in-alcohol microemulsion-containing composition concentrate containing oil-soluble corrosion inhibitor. The composition concentrate, when diluted with water, is useful in automotive coolant systems as an antifreeze.

28 Claims, No Drawings

OIL-IN-ALCOHOL MICROEMULSION CONTAINING OIL-SOLUBLE CORROSION INHIBITOR IN ANTIFREEZE

CROSS-REFERENCE TO RELATED APPLICATIONS

This application is related to the subject matter of co-pending U.S. application Ser. No. 754,732, filed on July 16, 1985, which is a continuation-in-part of U.S. application of Ser. No. 680,756, filed on Dec. 12, 1984, which, in turn, is a continuation in-part application of U.S. application Ser. No. 633,445, filed on July 23, 1984. This application is also related to the subject matter of U.S. application Ser. No. 595,421, filed on Mar. 30, 1984, and to co-pending U.S. application Ser. No. 633,445, filed on July 23, 1984.

FIELD OF THE INVENTION

The present invention relates generally to an antifreeze concentrate, and, more particularly, to an antifreeze concentrate containing an oil-in-alcohol microemulsion wherein the oil contains at least one oil-soluble corrosion inhibitor.

BACKGROUND OF THE INVENTION

Macroemulsions for use in antifreezes are well-known in the art. For example, ethylene glycol antifreeze compositions containing mineral oil plus an emulsifier or containing a barium sulfonate oil are well-known and were used commercially in automobiles up until the mid-1960's. The oil in these antifreezes provided excellent corrosion inhibition for the antifreezes by coating the metal surfaces of the coolant system with a so-called "magnetic film". However, in concentrate form, these emulsions are generally phase stable only for a very short period of time, e.g., perhaps two days or less, after which time they tend to separate into two phases.

With the advent of antifreeze overflow-tanks used to hold the volume expansion of antifreeze in a hot engine coolant system, these rather unstable macroemulsion antifreezes were replaced with other types of antifreezes, since a macroscopic two-phase antifreeze tends to congregate the less dense oil phase in the overflow tank thereby depriving the remaining parts of the cooling system of this corrosion-inhibiting component. For the above described reasons, the concept of macroscopic two-phase antifreezes is obsolete and current antifreezes are single phase, most notably the silicone silicate stabilized antifreezes disclosed in U.S. Pat. Nos. 3,337,496 and 3,341,469.

In recent years, microemulsions have been developed which are known for their long term storage stability, i.e. their ability to maintain an apparent single phase over an extended period of time. By way of illustration, oil-in-water microemulsions and water in oil microemulsions are extensively employed in the hydraulic fluid field. For example, U.S. Pat. No. 4,337,161 discloses oil-in-water microemulsions whereas U.S. Pat. No. 4,371,447 discloses water-in-oil microemulsions for use in hydraulic fluids, and the like.

Microemulsions, variously referred to as micellar solutions, "soluble oils", swollen micelles, etc., have been extensively discussed in the literature. See, for example, *Microemulsions,* I. D. Robb, Editor, Plenum Press (1981); and, *Microemulsions Theory and Practice,* L. M. Prince, Editor, Academic Press (1977). Microemulsions are typically characterized as clear, bright and transparent (and, hence, apparently homogeneous and microdispersed), whereas macroemulsions are visibly turbid and two phase. These characteristics are due to the fact that the particle (i.e. micro droplet) in a microemulsion is typically smaller than the wave-length of visible light. Although clear to the eye, the presence of the microemulsion particles can be detected by instrumental light-scattering techniques.

As used herein, the term "microemulsion" is used in its broadest sense to encompass faintly, turbid or opalescent compositions as well as completely clear ones. These microemulsion compositions are characterized by excellent ambient temperature storage stability and particle sizes of less than about 0.1 micron. The microemulsions are physically stable and do not phase separate upon standing at ambient temperature. In contrast, macroemulsions are turbid in appearance (e.g., milk) and tend to phase separate upon standing at ambient temperature.

Although the microemulsion, and the components thereof, present in oil-in-alcohol-containing antifreezes generally provides useful corrosion-retardation on cooling system metal surfaces, certain microemulsions, and the components thereof, provide less than optimum metal corrosion inhibition. Accordingly, it would be desireable to enhance the corrosion inhibition provided by antifreezes containing oil-in-alcohol microemulsions.

Heretofore, microemulsions in antifreeze, containing oil-soluble corrosion inhibitors, were not known in the art to the best of our knowledge. A possible reason for this absence is the conflicting requirements of such a composition. If the antifreeze ingredients are in stable, microemulsion form, there is a problem as to how the oil-soluble corrosion inhibiting components thereof will be made available to protect the metal surfaces of the car's coolant system.

OBJECTS OF THE INVENTION

It is the object of the present invention to provide an oil-in-alcohol antifreeze composition concentrate characterized by advantageous storage stability and, which upon dilution, provides a metal corrosion inhibiting antifreeze, that contains at least one oil-soluble corrosion inhibitor, wherein the oil is microdispersed and apparently homogeneous at ambient (low) temperature, but provides a corrosion-retardant coating on metal surfaces of the cooling system at automotive engine operating (higher) temperature.

It is a further and more specific object of the invention to provide a corrosion retardant antifreeze containing an oil-in-alcohol microemulsion and an oil-soluble corrosion inhibitor effective in inhibiting corrosion of one or more automotive cooling system metal surfaces.

These and other objects will become apparent from a reading of the following detailed specification.

SUMMARY OF THE INVENTION

In one aspect, the present invention relates to an oil-in-alcohol microemulsion- and oil-soluble corrosion inhibitor-containing antifreeze composition concentrate having a discontinuous phase and a continuous phase comprising:
(a) at least one alcohol, in an amount sufficient to form a continuous phase in the concentrate;
(b) alcohol-insoluble oil particles forming a discontinuous phase in said composition, said particles having a particle size less than about 0.1 micron (preferably less than about 0.05);

(c) at least one surface hydrophobizing compound selected from the group consisting of organic derivatives of the following: phosphate, sulfate, phosphonate, sulfonate, carboxylate, organoammonium and phosphonium salts, amine oxides, amphoteric and zwitterionic groups, succinates, and mixtures thereof; wherein the organic group is selected from the class consisting of the following radicals: alkyl, alkenyl, alkynyl, aryl, alkylaryl, arylalkyl, all having up to about 24 carbon atoms, alkyleneoxy, polyalkyleneoxy, and combinations thereof;

(d) at least one emulsifier present in an amount of from zero up to an amount sufficient to stabilize the microemulsion in the composition; and, (e) at least one oil-soluble corrosion inhibitor, in a corrosion inhibiting effective amount, said oil-soluble corrosion inhibitor being selected from the group consisting of azole compounds, phenol compounds, imidazoline compounds, substituted succinic acids and esters and partial esters thereof, amino acid derivatives, glycerol ethers, benzimidazoles, oxazolium hydroxides, acyl glycine oxazolines, N substituted hydropyrimidine derivatives, amino-triazole derivatives, hydrocarbyl alkoxy amino alkylene substituted asparagines, poly(oxyalkylated) hydrazines, thiourea derivatives, nitro compounds, nitrogen and sulfur heterocyclic compounds, sulfur-bridged hydrocarbon ring compounds, caesin sulfonate, organic acid salts of carboxylate- containing compounds, aminosuccinate derivatives and petroleum oxidates, and mixtures thereof.

In accordance with a further and preferred aspect of the present invention, the emulsifier or emulsifiers utilized are selected to provide the antifreeze with a cloud point of from about 40° C. to about 125° C. The resulting antifreeze possesses particularly preferred characteristics as will be described hereinafter.

In accordance with another aspect of the present invention, the antifreeze composition concentrate of this invention contains a surface hydrophobizing compound that can be of a type, and present in an amount, which will also impart partial or full stability to the microemulsion. As will be described hereinafter, many hydrophobizers can serve this additional function. If the full stabilizing function is performed by the hydrophobizing compound, then component (d) is not required. Accordingly whether stability is imparted by the hydrophobizer or by a separate emulsifier or by a mixture thereof will depend upon the antifreeze system selected.

In another aspect, the present invention relates to an antifreeze composition. The antifreeze composition can be made from the composition concentrate by dilution of the concentrate with water and/or alcohol at the use site.

In yet another aspect, the present invention encompasses methods for making the above antifreeze composition, either by direct addition of the oil-in-alcohol microemulsion to water and/or alcohol, or by adding water and/or alcohol to the oil-in-alcohol microemulsion, or by pre-forming the composition concentrate.

DETAILED DESCRIPTION OF THE INVENTION

The compositions of the present invention are characterized by long term concentrate storage stability, as well as a visually single-phase characteristic at ambient (low) temperature and either a visually two-phase or macrodispersed characteristic at operating engine (higher) temperatures in the automobile coolant systems (hereinafter also called "cooling systems"). The concentrate storage stability provides good "shelf-life" for the antifreeze concentrate during warehousing, bulk dispensing, and while on store shelves. The microdispersed, apparently homogeneous characteristic at ambient temperature makes it possible for the automotive "cooling system" overflow-tank to contain a uniform composition of all of the utilized antifreeze ingredients, thereby avoiding the congregation problems of the prior art macroemulsion containing antifreezes when used in a cooling system having an overflow tank.

The preferred two-phase high temperature characteristic of the antifreezes of the present invention facilitates the coating of the metal surfaces of the automotive coolant system with at least a part of the oil portion of the microemulsion, thereby affording the same excellent corrosion inhibition characteristics for these metal surfaces as was afforded by the prior art macroemulsion containing antifreezes. However, unlike the latter, the compositions of this invention can be used in the modern automobile coolant systems having a overflow-holding tank while maintaining a uniform distribution of the remaining portion of oil in the antifreeze coolant system, including the holding tank.

In accordance with another aspect of this invention, the presence of hydrophobizer in the present composition enhances the affinity of the oil component for the metal surfaces, thereby enabling even the microdispersed oil in the microemulsion to provide corrosion protection.

In accordance with yet another aspect, the oil useful in the present invention can be any material known as an "oil". Thus, any of the numerous substances that are liquid or easily liquifiable by warming and are "practically insoluble" in the continuous phase of the present composition can be employed as the oil phase.

As used herein, the term "practically insoluble" means that the amount of oil present exceeds the ordinary solubility limit of the oil in the continuous phase of the composition at ambient temperature. It is preferred to utilize an oil which is completely insoluble in the continuous alcohol medium. Thus, it is believed that any dissolved oil will generally be less effective in providing the desired corrosion inhibition in comparison to that of the non-dissolved oil.

The oil useful in the present invention may be obtained from a wide variety of sources, including such diverse sources as animal, vegetable, mineral or synthetic manufacture. Moreover, the composition of the oil is also not critical; and it may be composed of such diverse materials as predominantly hydrocarbons, such as mineral and petroleum oils, fatty acid esters, fats, silicone oils, polyalkylene oxides and ester derivatives thereof, or mixtures thereof, and the like.

Based upon the above, the term "oil" is intended to include, but is not intended to be limited to, any organic compound which is practically insoluble in alcohol such as ethylene glycol or propylene glycol, or mixtures thereof, but which can be emulsified by the use of at least one surfactant. Such oils include non-polar and partially polar, aliphatic and aromatic materials, such as mineral oil, paraffin oil, vegetable oil, naphtha oil, petroleum base oil, mixed xylenes, kerosene, mineral spirit, transformer oil, fuel oil, silicone oil, silane esters, synthetic oil, halogenated oils, polypropylene glycols, propylene oxide/ethylene oxide copolymers, propylene oxide/butylene oxide copolymers, ethylene oxide/butylene oxide copolymers, ethylene oxide/propylene oxide/butylene oxide terpolymers, as well as sulfated, sulfonated, phosphated and phosphonated oils, higher alcohols and esters thereof, and the like.

It will be generally preferred to select an oil having a vapor pressure of less than 80 mm. of Hg at 25° C. Utilizing such an oil should minimize, in use, the amount of oil that is lost due to vaporization during the use of the antifreeze.

The amount of oil present in the microemulsions of the present invention can vary over a wide range, but is preferably between about 0.001 to about 5 (more preferably between about 0.1 and about 3) wt. percent based upon the total weight of the microemulsion. Within the above-specified preferred ranges, the amount of oil used in the microemulsion is dependent upon the nature of the particular oil selected, as well as the interaction of the oil with the hydrophobizer and emulsifier chosen. Thus, the amount of oil used in a particular microemulsion containing antifreeze depends upon such factors as the coating efficiency of the oil and the physical stability of the oil in the system selected. Below about 0.001 wt. percent, the amount of oil would generally be insufficient to be functional, whereas above about 5 weight percent the antifreeze may not satisfy governmental freezing point depression specifications for antifreeze.

Although the oil present in oil-in-alcohol microemulsion containing antifreeze compositions will generally provide corrosion inhibition to these compositions, it has been found by virtue of the present invention that enhanced corrosion inhibition beyond that provided by the oil is provided by using only certain compositions that are conventionally used in oil fluid applications, such as hydraulic fluids, while others do not provide this enhanced corrosion inhibition. It is also noteworthy that these oil-soluble compositions provide enhanced corrosion inhibition to microemulsion-containing antifreezes even though they are not effective in conventional aqueous alcohol antifreezes. The discovery of effective oil-soluble corrosion inhibitors useful in the antifreezes of the present invention is all the more significant since water-soluble corrosion inhibitors that are effective in conventional aqueous alcohols are expected to be less effective in the oil containing antifreezes of the present invention due to the competition between these water-soluble corrosion inhibitors and the oil particles for coating the cooling system metal surfaces. However, based upon the teachings of the present invention, enhanced corrosion-inhibiting effectiveness of a combination of oil-soluble and water-soluble corrosion inhibitors can be achieved by suitable selection of the system constituents. For example, in a particular system the hydrophobizer may be chosen to achieve the specific coating of only certain cooling system metal surfaces. Corrosion inhibition of the remaining metal surfaces in the cooling system can then be achieved using appropriate water-soluble corrosion inhibitors.

Only certain, tested oil-soluble compounds have been found effective in enhancing the corrosion inhibition characteristics of microemulsion-containing antifreezes whereas other tested compounds that are conventional oil-soluble corrosion inhibitors are not effective in the present microemulsion containing antifreezes. By way of illustration, many oil-soluble metal working fluid and lubricant additives can be quite limited in their usefulness in automobile cooling systems. For example, a compound possessing superior antirust and antiwear properties in an automobile crankcase may have little or no corrosion inhibiting properties, or may even be a corrosion accelerant in an automobile cooling system. In addition, the specificity of the oil-soluble corrosion inhibitor toward metals in our antifreezes as compared to its function in conventional oil based systems may vary considerably. In addition, certain known oil-soluble corrosion inhibitors for specific metals in oil-based systems perform poorly on those metals in the instant antifreezes, but provide corrosion inhibition on other cooling system metals.

Although not wishing to be bound by any particular theory, the corrosion-inhibitive effectiveness of the oil-soluble corrosion inhibitors of the present invention is probably a result of the unique working environment of the hot diluted aqueous oil-in-alcohol microemulsion. This environment departs from typical use conditions for oil-soluble corrosion inhibitors when used in our antifreezes due to: the high concentration of water present, high turbulence throughout the system and high levels of emulsifier. Additionally, use of oil-soluble corrosion inhibitors in an oil-in-alcohol microemulsion antifreeze requires that these oil-soluble corrosion inhibitors possess the following characteristics: (a) hydrolytic and thermal stability to the extent required to satisfy the characteristics given in (b) through (f) below, (b) low toxicity and ecological compatibility, (c) low partition coefficient into the glycol or aqueous glycol phase of the antifreeze at room temperature (i.e., about 20° C.), (d) forms a protective coating on at least a portion of the cooling system metal surfaces at least at elevated engine operating temperature (i.e., about 85° C.) and preferably also at room temperature (i.e., about 20° C.), (e) does not interfere with the heat transfer characteristics between the antifreeze and the cooling system metal surfaces and, (f) compatible with the other components of the antifreeze. All of these factors, and others, make it surprising that effective supplemental corrosion inhibitors for our antifreezes have now been found.

As stated above, useful oil-soluble corrosion inhibitors for the present invention are those which are preferentially soluble in the oil phase of the antifreeze. This is particularly important at room temperature. At engine operating temperature (about 85° C.) a more balanced solubility such that the oil-soluble corrosion inhibitor will be positioned at the oil/aqueous alcohol interface, but preferably will remain in the oil phase, is desired. Although not wishing to be bound by any particular theory, surface interfacial interactions are believed to be important controlling factors in the corrosion performance of the oil-soluble corrosion inhibitors of this invention. The major interfacial interactions that are present in our system are: (i) oil-aqueous alcohol, (ii) metal-aqueous alcohol, (iii) metal oil, and (iv) metal-vapor. These interfacial interactions are influenced by the temperature of the system, depending upon whether the temperature is ambient or engine operating temperature ($\sim 85°$ C.). At engine operating temperatures, at or near boiling, metal surfaces tend to dehydrate or desolvate. At boiling sites, the metal liquid interface more closely resembles a metal-vapor interface. Such a change in the nature of the interfacial characteristics of the automobile cooling system at engine operating temperature has a direct impact on the functioning of the emulsifier and the oil-soluble corrosion inhibitor in the antifreeze.

In order to further delineate useful characteristics for preferred oil-soluble corrosion inhibitors, a brief discussion comparing with the characteristics of some emulsifiers is necessary. Some emulsifiers which stabilize the microemulsion at ambient temperature exhibit inverse temperature solubility and begin to dehydrate/desolvate at elevated temperatures, becoming more hydrophobic and olephilic (or, conversely, more hydrophilic and oleophobic). This destabilizes the microemulsion resulting in an apparent phase separation between the oil and aqueous alcohol phases.

It is important to note that the phase separation by elevated temperature "breaking" of the microemulsion causes the oil to carry the oil soluble corrosion inhibitor dispersed therein out of the aqueous alcohol continuous phase and onto or in close proximity to the metal surfaces of the cooling system. The coating of the metal surfaces with oil enables the oil-soluble corrosion inhibitors carried to the metal surfaces to concentrate at, or be in close proximity to, the metal surfaces where they can perform their corrosion inhibiting function.

In a preferred aspect of the present invention, the oil-soluble corrosion inhibitor will exhibit the opposite inverse temperature solubility to that exhibited by the emulsifier, causing the oil soluble corrosion inhibitor to convert from predominantly oleophilic at room temperature to predominantly oleophobic at elevated temperature without reducing the glycophobic character of the oil-soluble corrosion inhibitor. Based upon these solubility considerations, the relative partitioning of the oil-soluble corrosion inhibitors at the oil/aqueous alcohol interfaces of the antifreeze increases the likelihood of contact between the oil soluble corrosion inhibitor and the metal surface upon "breaking" of the microemulsion followed by migration of the oil to the hydrophobizer-treated metal surfaces.

The oil-soluble corrosion inhibitors useful in the antifreezes of the present invention contains at least one functional moiety (hereinafter "metal-philic moiety") that provides an affinity to the metal surfaces of the cooling system. Unlike the hydrophobizing agent discussed below, the metal-philic moiety of the oil-soluble corrosion inhibitor need not bond to the metal surfaces of the cooling system, although preferably they would form such a bond. Indeed, the metal-philic group may be ionic, such as anionic (e.g. $CO_2^-$), cationic (e.g. $R_4N^+$) or zwitterionic (e.g. betaines); an electron donor substituent (e.g. N, O, or S); or, a moiety capable of hydrogen bonding.

The oil-soluble corrosion inhibitors useful in the present invention are preferentially soluble in the oil present in the antifreeze vis-a-vis the alcohol or aqueous alcohol present at room temperature ($\sim 20°$ C.). Additionally, the oil soluble corrosion conductors must provide a measurable amount of corrosion retardation with respect to at least one cooling system metal, viz.—aluminum, cast iron, brass, solder, copper, steel. The preferred oil-soluble corrosion inhibitors are the oil-soluble azole compounds phenol compounds, imidazoline compounds, substituted succinic acid esters and partial esters, and amino acid derivatives, more preferably oil-soluble alkylated triazole compounds. Typical of such alkylated triazole compounds is that commercially available as "REOMET 39", a product of Ciba-Geigy Corporation.

The above preferred oil-soluble corrosion inhibitors were found to be effective when used in paraffin oil containing microemulsion antifreezes. In accordance with the teachings of the present invention, the selection of other oil-soluble corrosion inhibitors is suitably made depending upon the choice of oil and other components in the microemulsion for a particular application.

In addition to the above list of compounds that are effective as oil-soluble corrosion inhibitors in the antifreeze of the present invention, other classes of compounds are expected to provide enhanced corrosion protection. These include glycerol ethers, benzimidazoles, oxazolium hydroxides, acyl glycine oxazolines, N substituted hydropyrimidine derivatives, amino triazole derivatives, hydrocarbyl alkoxy amino alkylene-substituted asparagines, poly(oxyalkylated) hydrazines, thiourea derivatives, nitro compounds, nitrogen and sulfur heterocyclic compounds, sulfur-bridged hydrocarbon ring compounds such as diphenylsulfide, caesin sulfonate, organic acid salts of carboxylate-containing compounds, aminosuccinate derivatives and petroleum oxidates. As stated above, the selection of the particular oil-soluble corrosion inhibitors is made based upon the oil chosen for a given application in accordance with the teachings of the present invention.

As used herein, the term "continuous" or "outer" phase means the alcohol phase that extends through all parts of the microemulsion in a continuous fashion. This outer phase is to be distinguished from the particulate, discontinuous, inner oil phase. As is well recognized, the maximum packing fraction of uniform spheres would make it possible for the outer phase to be as small in amount as 26 vol. % based upon the total volume of both phases (which is about the same on a weight basis). Preferably, the outer alcohol phase comprises at least 50 wt. % (more preferably at least 90 wt. %) based upon the total weight of both phases.

The alcohols useful as the continuous (or outer) phase in the present invention include methanol, ethanol, propanol, butanol, ethylene glycol, diethylene glycol, propylene glycol, dipropylene glycol, glycerol, butylene glycol, the monoacetate of propylene glycol, the monoethylether of glycerol, the dimethyl ether of glycerol, alkoxy alkanols (such as methoxyethanol), and the like, and mixtures thereof. The preferred alcohol is selected from the group consisting of ethylene glycol, diethylene glycol, propylene glycol, dipropylene glycol and mixtures thereof.

As used herein, the term "hydrophobizing agent" denotes a compound that is adsorbed by, or adheres to, the metal surfaces of a cooling system and imparts an affinity between the thus-modified metal surfaces and the oil in the microemulsion.

One end of the molecule attaches or anchors itself to the metal surfaces in the automotive cooling system. To provide long term effectiveness, the moiety selected should have temperature and chemical stability in the cooling system environment, viz.—should not be easily hydrolyzable or strippable from the surface.

The other end of the molecule of the hydrophobizing agent serves to attract the oil to the thus-coated surface to provide the requisite oil film that imparts the corrosion inhibition characteristics of the antifreeze composition concentrates of this invention. This end of the hydrophobizing agent molecule, typically an organic moiety, should satisfy the following criteria.

First of all, the organic moiety should desirably, and preferably, not result in undue coating of the metal surfaces, be this due to the oil or the hydrophobizer. Excessive build-up may result in less than optimum heat transfer characteristics, and such excessive build-up can be determined by measuring the heat transfer efficiency of the cooling system employed.

Secondly, the organic moiety should be sufficiently compatible with the particular oil so that the desired, protective oil film will result. Adequately compatible materials may be readily selected by ascertaining the contact angle between the oil particle and the coated surface. The contact angle, for suitably compatible materials, should be less than 90°, with lower contact angles being preferred, viz.—the lower the contact angle, the more readily will the desired oil film be provided.

Lastly, when an emulsifier is utilized, the organic moiety of the emulsifier should desirably have less affinity for a primary layer of the hydrophobizer adsorbed on the surface than to that of the oil particles, preferably substantially less attractiveness. The reason for this preference is that undue build up of emulsifier on the coated metal surfaces can interfere with formation of the desired oil film, since the coated surface is thereby rendered hydrophilic, as well as perhaps adversely affecting the stability of the antifreeze composition.

The hydrophobizing agents useful in the antifreezes of the present invention are selected after consideration of the type of oil and the emulsifier selected. Hydrophobizing agents typically would be chosen from the group consisting of organic derivatives of the following: phosphate, sulfate, phosphonate, alkyl and alkynyl succinates, sulfonate, carboxylate, ammonium and phosphonium salts, amine oxides, phosphine oxides, amphoteric and zwitterionics such as betaines and sulfobetaines and mixtures thereof wherein the organic group is selected from the class consisting of the following radicals: alkyl, alkenyl, alkynyl, aryl, all having up to about 24 carbon atoms, alkyleneoxy, polyalkyleneoxy, and combinations thereof.

Generally, the organophosphates useful as hydrophobizing compounds in the present invention are identified by the structural formula:

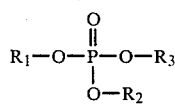

wherein each substituent $R_1$, $R_2$, and $R_3$ is selected from the class consisting of the following radicals: hydrogen; alkyl, aryl, alkenyl and alkynyl, with each of the foregoing having up to about 24 carbon atoms; alkyleneoxy, polyalkyleneoxy; phosphate or polyphosphate or their salts; and combinations thereof; with the proviso that at least one of said substituents is an organic radical within the class listed above or combinations thereof.

The preferred organophosphates have the structural formula identified above wherein at least one R substituent consists of an organic radical containing an alkylene oxide polymer or copolymer derivative of the form $R_4O(PO)_x(EO)_y(BO)_z-$, wherein "BO" denotes the butylene oxide radical and wherein the alkylene oxide units may be either random or blocked and wherein $x>y>>z$ and $x+y+z \leq$ about 100, and $R_4$ is selected from the class of radicals: hydrogen; alkyl, aryl, alkenyl, alkynyl, arylalkyl and alkaryl, with the foregoing having up to about 24 carbon atoms; phosphates, polyphosphates and salts thereof, and combinations thereof. These organophosphates preferably have molecular weights below about 10,000 to insure solubility in the antifreeze composition. Antifreeze compositions incorporating these preferred hydrophobizing agents are the subject of commonly-assigned co-pending U.S. application Ser. No. 633,210.

More preferred hydrophobizing agents are the organophosphates identified by structural formulae I to III, including the free acids and salts thereof, together with mixtures thereof:

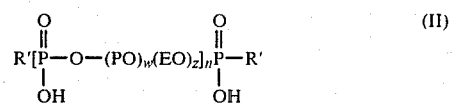

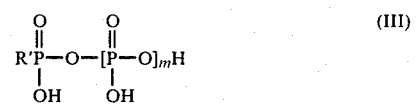

wherein
$R' = [RO(PO)_x(EO)_y]$ wherein $R = H$ or alkyl, aryl, alkenyl, alkynyl alkylaryl or, arylalkyl having up to 24 carbon atoms
PO = Propylene oxide radical
EO = Ethylene oxide radical
$x = 1$ to 100
$y = 0$ to 100
$k = 1$ to 3, with the proviso that k can be 3 if at least one R' group is removed from the phosphate ester by hydrolysis prior to, or during, use
$n = 1$ to 100
$w = 0$ to 100, with the proviso that if $w \geq 1$, then x can be zero
$z = 0$ to 100
$m = 1$ to 10

Within a given formula x, y, w or z group is the same or different number.

Typical useful classes of organophosphates falling within the groups identified by structural formulae I through III above, are identified as follows:

Example 1:

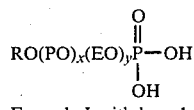

Formula I with $k = 1$

Example 2:

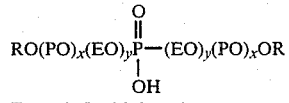

Formula I with $k = 2$

Example 3:

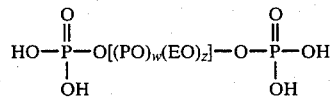

Formula II with $n = 1$
$x = 0$
$y = 0$
$R = H$

Example 4:

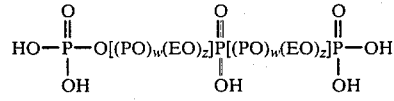

-continued
Formula II with n = 2
x = 0
y = 0
R = H

Example 5: 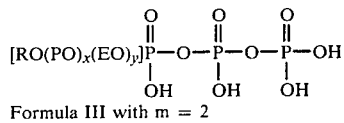

Formula III with m = 2

Other less preferred hydrophobizers are organic derivatives of: a sulfonate, such as barium alkyl benzene sulfonate; a phosphonate, such as dodecyl phosphonate; a carboxylate, such as a carboxylic acid grafted on an polyalkylene glycol; alkylsuccinates such as dodecyl succinate; alkynyl succinates such as dodecenyl succinate; organoammonium salts, such as cetyltrimethylammonium chloride, and the like.

The amount of hydrophobizing agent, which is dispersed in the present microemulsion composition of the present invention, can vary over a wide range, but is preferably between about 0.001 and about 30 (more preferably between about 0.005 and about 1) wt. percent, based upon the total weight of the microemulsion. Below about 0.001 wt. percent, the amount of hydrophobizing agent would generally be insufficient to be effective, whereas above about 30 percent, the hydrophobizer is expected to provide no further significant hydrophobizing benefits. Also, bi-layer-pairing of hydrophobizing agent molecules with resultant reduction in metal surface hydrophobicity can result if an excessive amount of hydrophobizer is used.

Certain hydrophobizers will perform a dual role in not only providing an affinity between the engine cooling system metal surfaces and the oil in the microemulsion but also can serve as an emulsifier for the microemulsion. Indeed, with the possible exception of the non-ionics, each class of emulsifiers for the microemulsion described herein includes specie capable of also acting as a hydrophobizer. Many factors will dictate whether a separate emulsifer or emulsifiers should be used, including cost, adequacy of stability, and foaming considerations. If the emulsifying role is not considered adequately performed by the hydrophobizer, then a separate emulsifier should be utilized.

The emulsifiers useful in the present invention include any of a wide range of anionic surfactants, such as the organophosphates, phosphonates, sulfates and sulfonates, as well as salts of fatty acids; cationic surfactants such as organoammonium and phosphonium salts; and non-ionic surfactants such as alkoxylated alcohols, phenols, and amines, and fatty acids, and the like; and amphoteric and zwitterionic groups such as betaines and sulfobetaines, that are well-known in the art. Yet another group of surfactants useful as emulsifiers would include alkyl amine oxides, alkyl phosphine oxides, and the like. Certain inorganic compounds known to be active as emulsifiers, such as soluble borate and phosphate salts, can be employed as emulsifiers in the present invention.

The above emulsifiers can be used singly or in combination as illustrated in the Examples given below. A combination of at least two surfactants is preferred in order to facilitate microemulsification and thereby reduce or minimize the total emulsifier requirement. Also, water in low concentrations is optionally used to enhance the stability of the microemulsion-containing antifreeze concentrates, preferably in an amount of less than 10 weight percent based upon the weight of the microemulsion.

Preferably, although a composition without a cloud point is also useful, at least one emulsifier employed in the compositions of the present invention provides the antifreeze with a "cloud point", viz.—the emulsifier exhibits reverse temperature solubility in the aqueous alcohol of the antifreeze. Thus, it is preferred to employ at least one emulsifier which provides a cloud point for the antifreeze at between about 40° C. and about 125° C., more preferably between 65° C. and 125° C., most preferably between 65° C. and 90° C. The lower limit of 40° C. is well above ambient temperature, whereas the upper limit of 125° C. is generally below automotive engine temperatures.

The existence of this cloud point makes it possible for the emulsifier possessing this property to "break" the microemulsion when the microemulsion temperature rises to its cloud point temperature range in the hot portions of an operating engine coolant system, thereby allowing the oil to coat the metal surfaces with which it comes in contact. More particularly, it is believed that the "breaking" of the microemulsion provides, in effect, a driving force that allows the oil to more readily coat the metal surfaces.

In cooler portions of the engine coolant system, for example, in the overflow-tank, and below the cloud point temperature range of the emulsifier selected, the composition will be in microemulsion or stable dispersed macroemulsion form. Re-microemulsification of the antifreeze composition components in the various portions of the engine coolant system takes place when the engine is not operating, and thus allowed to cool down so that the antifreeze temperature drops below its cloud point.

The preferred emulsifiers for use in the present invention are the non-ionic surfactants. These are preferred because they are generally low foaming and generally provide favorable cloud point temperatures for the antifreeze. Further, non-ionic surfactants are preferred since the use of such surfactants should eliminate or at least minimize any unfavorable reaction or association with the remainder of the antifreeze, typically ionic in character, that is present in an automotive cooling system.

In general, the total emulsifier concentration present in the microemulsion (viz.—the total concentration of the emulsifier plus the concentration of any hydrophobizing agent if it serves as an emulsifier) should be between about 0.1 times and about 100 times (preferably between about 0.5 times and about 50 times, more preferably between about 2 and about 10 times) the concentration of oil present in the microemulsion, with the proviso that the total amount of oil plus emulsifier and alcohol cannot exceed 100 wt. percent of the microemulsion. If the surfactant concentration is below about 0.1 times the oil concentration, the microemulsion is likely to be unstable. If the surfactant concentration is above about 100 times the oil concentration, it is likely that resulting composition will not be economically feasible from a commercial standpoint.

The antifreeze concentrate of the invention preferably has a pH of between about 5.5 and about 11 in order to provide a working antifreeze pH of between about 8 and about 11. However, the particular pH selected for the working antifreeze may be varied as desired. It should, of course, be appreciated that the working pH selected may affect the adherency or substantivity of the hydrophobizer coating on the metal surfaces. The efficacy of the particular working pH for the hydrophobizer selected may be readily ascertained.

Buffers can be included in the concentrate to provide this pH range, and a wide variety of buffers are known and have been used in antifreeze compositions. As representative examples, suitable buffers include, but are not limited to, borates, phosphates, dibasic acids, such as sebacates and benzoates, hydroxy benzoates, carbonates, bicarbonates, or mixtures thereof. If used, the buffer is preferably employed in an amount of between 0.1 and about 5 wt. percent based upon the weight of the concentrate. Below about 0.1 wt percent, the buffer would not be expected to be effective, whereas above about 5 wt. percent, the amount of buffer is expected to be too costly for a commercial antifreeze.

Other optional additives may be employed in minor amounts of less than 50 wt. percent based on the weight of the concentrate. Typical optional additives would include, for example, known corrosion inhibitors for aluminum or other metals, in admixture with the oils and the hydrophobizing agents of the present invention, such as, for example, molybdates, sebacates, carbonates, silicates, alkali metal nitrates, alkali metal nitrites, diisopropylamine nitrite, dicyclohexylamine nitrate, tolyltriazole, mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide a measurable amount of corrosion inhibition with respect to the metal (e.g. copper, steel, brass, aluminum, cast iron, solder etc.) surfaces to be protected as compared to the antifreeze without these inhibitors.

The oil phase can be employed to serve as a carrier for other useful types of additives in addition to corrosion inhibitors. As illustrative examples, oil-soluble biocides, oxidation inhibitors, taste repellants, and the like may be advantageously utilized.

Other typical optional additives that may be used include wetting agents and surfactants such as, for example, known ionic and non-ionic surfactants such as the poly(oxyalkylene) adducts of fatty alcohols; defoamers and/or lubricants such as the well known polysiloxanes and the polyoxyalkylene glycols, lubricants such as silicone pump lubricants, as well as any other minor ingredients known in the art that do not adversely affect the antifreeze characteristics sought to be achieved.

One minor additive that is particularly preferred is a defoamer in view of the substantial quantities of emulsifier often employed in the concentrate of the present invention. More particularly, the quantities of emulsifier utilized to provide the microemulsion with the desired stability can cause undesirable foaming in the cooling system. If such foaming occurs, this may be satisfactorily minimized by utilizing a defoaming agent.

A variety of such defoamers are known and may be used. A particularly preferred defoamer is commercially available under the trademark "SAG" (a silicone defoamer product of Union Carbide) and is preferably employed in amounts of less than 0.5 wt. percent based upon the weight of the microemulsion in the antifreeze. An appropriate defoamer should meet the following criteria (a) good storage stability in the antifreeze concentrate at ambient temperature and, (b) it will not adversely affect the action of the hydrophobizer, emulsifier, or the oil-soluble corrosion inhibitor additive.

The microemulsions of the present invention can be prepared by any known method such as, for example, by mixing the individual components together for a short period of time. Another procedure for preparing microemulsions is to heat a mixture of the individual ingredients, while stirring, and then allow the resulting microemulsion to cool to room temperature. The sequence of addition of the oil, alcohol, and surfactant to the microemulsion mixture is not critical; and the order most convenient may be selected. Procedures for preparing microemulsions are well known in the art and are more fully described, for example, in *Microemulsions Theory and Practice,* Leon M. Prince, Editor (Academic Press, Inc. 1977), the disclosure of which is incorporated herein by reference.

If desired, the antifreeze concentrate of this invention may be utilized in combination with other antifreeze concentrates. For example, the antifreeze concentrates of the present invention may be utilized with state-of-the-art antifreeze compositions. U.S. Pat. No. 3,337,496 is representative of this type of technology.

The following Examples are intended to illustrate, but in no way limit, the scope of the present invention.

EXAMPLE 1

GLASSWARE CORROSION TEST OF MICROEMULSION CONTAINING, OIL-SOLUBLE CORROSION INHIBITOR CONTAINING ANTIFREEZE ON METAL SPECIMENS

This Example shows the corrosion inhibiting characteristics achieved using an antifreeze of the present invention containing a microemulsion and an oil-soluble corrosion inhibitor. An oil-in-alcohol microemulsion-containing working antifreeze solution with an oil-soluble corrosion inhibitor was prepared using the concentrate formulation given in Table 1 and additionally containing 66.4 wt. % corrosive water containing 100 ppm $SO_4^=$, $HCO_3^-$, $Cl^-$, all added as the Na salts.

TABLE I

| Components | FLUID COMPOSITIONS Weight % | |
|---|---|---|
| | Fluid 1 (Control Base Fluid) | |
| Ethylene Glycol | 96.9101 | |
| $Na_2B_4O_7 5H_2O$ | 2.0531 | |
| NaOH - 50% aqueous. | 1.0368 | |
| | 100.0000 | |
| | Fluid 2 Comparison Fluid | |
| Fluid 1 | 98.48 | |
| Paraffin Oil | 0.20 | |
| TERGITOL NP-4** | 0.20 | |
| TERGITOL 24-L-50*** | 1.00 | microemulsion stock |
| GAFAC RB-400**** | 0.12 | |
| | 100.00 | |
| | Fluid 3 | |
| Fluid 1 | 98.48 | |
| Oil plus inhibitor* | 0.20 | |
| TERGITOL NP-4** | 0.20 | |
| TERGITOL 24-L-50**** | 1.00 | microemulsion stock |
| GAFAC RB-400**** | 0.12 | |

TABLE I-continued

FLUID COMPOSITIONS

| Components | Weight % |
|---|---|
| | 100.00 |

Footnotes to Table 1:
*Contains 0.10 wt. % mineral oil and an oil soluble corrosion inhibitor additive consisting of 0.10 wt. % 5-dodecylbenzotriazole, based on the total weight of Fluid 3.
**A nonylphenol ethoxylate surfactant of Union Carbide Corporation having an average of 4 ethoxy groups per molecule.
***A surfactant product of Union Carbide comprising ethoxylates of linear alcohols having an average number of carbons between 12 and 14 and having an average of 7 ethoxy groups per molecule and having an aqueous cloud point of 50° C.
****An ethoxylated alkyl phosphate product of GAF Corporation.

These ingredients were mixed thoroughly with a magnetic stirrer. Next, 984.8 grams of the base fluid (Fluid 1) was weighed out and 15.2 grams of the well mixed microemulsion stock above was added to it and mixed thoroughly with a magnetic stirrer.

If this mixture afforded a clear solution after mixing (≦16 hr) at room temperature, it was considered a suitable microemulsified antifreeze concentrate. A small sample of this clear concentrate was set aside to measure long term stability, i.e., clear and single phase with no apparent separation with time (≦2 months).

If the mixture appeared cloudy or had a separate second liquid phase present after 16 hours mixing, additional Tergitol ® 24-L-50 surfactant was added dropwise with stirring until clarity was achieved. If the mixture did not clarify with additional surfactant, up to 2.5 wt. percent based on the weight of the mixture, the sample was rejected from further experimentation as not being a true microemulsion. Any additional surfactant added was included in calculating the % weight contribution of each component as shown in Table I.

The next step of preparation required dilution with ASTM corrosive water (100/100/100 ppm; $Cl^-/HCO_3^-/SO_4^{-2}$) to a final concentration of 33% (V/V) of the microemulsified oil in ethylene glycol in corrosive water.

With only a few exceptions, all the microemulsified glycol concentrates afforded a clear homogeneous single phase solution upon dilution with corrosive water. The few exceptions were initially slightly cloudy at or below room temperature but gentle heating easily produced a single phase microemulsion.

When fluids 2 and 3 from Table I were heated on a hot plate to the specified operating test temperature of 85°-90° C., the test solutions clouded (i.e., the microemulsion suspension was broken and the oil component phase was released) at about 50°-60° C. during the initial 20-30 minutes of heating.

At the completion of the 2 week test period, the test solutions were cooled to room: temperature whereupon a clear solution appearance returned. Occasionally, the clear appearance would be complicated by the presence of suspended or precipitated corrosion products. The metal test specimens were worked up in accordance with the ASTM-D-1384 procedure to obtain the weight loss values.

Table II provides the results obtained from ASTM-D-1384 glassware testing of the comparative microemulsion (fluid 2) and the experimental microemulsion (fluid 3) containing the oil-soluble additives.

TABLE II

ASTM-D-1384 GLASSWARE TEST
Specimen Weight Loss (mg) per 1 in. × 2 in. specimen*

| Fluid # | Mod | Cu | ASTM | Br | St | C.Fe | Al |
|---|---|---|---|---|---|---|---|
| 2 | 52 | 6 | 11 | 4 | 2 | 1 | 83 |
| 3 | 14 | 6 | 6 | 6 | 3 | 0 | 54 |

*In this table, "Mod" denotes modine solder having a high lead content of greater than 90 wt. % based on the weight of the solder; "Cu" denotes copper; "ASTM" denotes ASTM solder; "Br" denotes brass; "St" denotes steel; "C.Fe" denotes cast iron; and, "Al" denotes aluminum.

This data specifically demonstrates that for some metals, the oil-soluble additive of fluid 3 provides a significant improvement in corrosion protection, as compared to the comparison with no oil-soluble corrosion inhibitor additive (fluid 2).

EXAMPLE 2

Additional oil-soluble corrosion inhibitors were tested in accordance with the procedure of Example 1 using a base fluid of either fluid 2 (see Table I above) or fluid 4. Fluid 4 had the following composition. The compositions containing the oil-soluble corrosion inhibitor additive given in Table II and III below were prepared by replacing the paraffin oil of Fluids 2 and 4 with 0.2 wt. percent of the specified oil-soluble additive.

Fluid 4

| Components | Weight % |
|---|---|
| Component X | 98.48 |
| paraffin oil | 0.20 |
| TERGITOL NP-4 | 0.20 |
| TERGITOL 24-L-50 | 1.00 |
| GAFAC RB-400 | 0.12 |
| | 100.00 |

Wherein Component X had the following composition:

Component X

| Components | Weight % |
|---|---|
| Ethylene Glycol | 96.4307 |
| $Na_2B_4O_7$—$5H_2O$ | 1.9620 |
| NaOH-50% aqueous | 0.9908 |
| NaTTZ-50% aqueous | 0.1165 |
| $NaNO_3$-50% aqueous | 0.5000 |
| | 100.0000 |

The results for the ASTM-D-1384 glassware comparison as given in Table III in terms of rams weight loss and Table IIIa in terms of relative performance shows that several oil-soluble corrosion inhibitors, when added to the microemulsion-containing antifreezes of fluids 2 and/or 4, improved the antifreeze corrosion inhibition on at least one metal tested.

TABLE III

MICROEMULSIONS WITH VARIOUS OIL-SOLUBLE INHIBITORS
Specimen Weight Loss (mg) per 1 in: × 2 in. Specimen as Compared to Fluid 2 or 4
ASTM-D-1384 Glassware Test Results*

| Oil Soluble Additive | Mod | Cu | ASTM | Br | St | C.Fe | Al |
|---|---|---|---|---|---|---|---|
| (None) Fluid 2 | 115 | 6 | 12 | 4 | 3 | 5 | 39 |
| (None) Fluid 4 INLAND 07[1] | 39 | 5 | 5 | 5 | 5 | 3 | 61 |
| Fluid 2 | 212 | 3 | 5 | 3 | 7 | −2 | 53 |
| Fluid 4 | 176 | 4 | 9 | 3 | 4 | 1 | 49 |

TABLE III-continued

MICROEMULSIONS WITH VARIOUS OIL-SOLUBLE INHIBITORS
Specimen Weight Loss (mg) per 1 in: × 2 in. Specimen as Compared to Fluid 2 or 4
ASTM-D-1384 Glassware Test Results*

| Oil Soluble Additive | Mod | Cu | ASTM | Br | St | C.Fe | Al |
|---|---|---|---|---|---|---|---|
| INLAND 21[2] | | | | | | | |
| Fluid 2 | 84 | 2 | 6 | 2 | 0 | 0 | 42 |
| Fluid 4 | 157 | 4 | 9 | 5 | 4 | 2 | 53 |
| LUBRIZOL 52[3] | | | | | | | |
| Fluid 2 | 91 | 4 | 18 | 5 | 4 | 6 | 47 |
| LUBRIZOL 677A[4] | | | | | | | |
| Fluid 2 | 126 | 45 | 32 | 16 | 31 | 75 | 55 |
| LUBRIZOL 850[5] | | | | | | | |
| Fluid 2 | 126 | 6 | 9 | 5 | 6 | −1 | 50 |
| Fluid 4 | 116 | 5 | 12 | 7 | 4 | 2 | 16 |
| LUBRIZOL 5391[6] | | | | | | | |
| Fluid 2 | 368 | 5 | 7 | 4 | 2 | 5 | 58 |
| Fluid 4 | 523 | 7 | 9 | 6 | 4 | 2 | 16 |
| LUBRIZOL 5530[7] | | | | | | | |
| Fluid 4 | 265 | 6 | 11 | 7 | 6 | 2 | 18 |
| LUBRIZOL 5991[8] | | | | | | | |
| Fluid 2 | 112 | 4 | 11 | 3 | 3 | 15 | 30 |
| LUBRIZOL 8151[9] | | | | | | | |
| Fluid 4 | 55 | 7 | 10 | 7 | 5 | 2 | 57 |
| MOBILAD C603[10] | | | | | | | |
| Fluid 4 | 74 | 6 | 7 | 6 | 4 | 2 | 38 |
| Additive Z[11] | | | | | | | |
| Fluid 2 | 14 | 6 | 6 | 6 | 3 | 0 | 54 |

*Each weight loss number is an average of 3 tests.

TABLE IIIa

MICROEMULSIONS WITH VARIOUS OIL-SOLUBLE INHIBITORS
Relative Specimen Weight Loss as Compared to Fluid 2 or 4
BASED UPON A 70% STATISTICAL CONFIDENCE INTERVAL
ASTM-D-1384 Glassware Test Results

| Oil Soluble Additive | Mod | Cu | ASTM | Br | St | C. Fe | Al |
|---|---|---|---|---|---|---|---|
| (None) Fluid 2 | 0 | 0 | 0 | 0 | 0 | 0 | 0 |
| (None) Fluid 4 | 0 | 0 | 0 | 0 | 0 | 0 | 0 |
| INLAND 07[1] | | | | | | | |
| Fluid 2 | − | + | + | 0 | 0 | 0 | − |
| Fluid 4 | − | + | − | + | 0 | + | + |
| INLAND 21[2] | | | | | | | |
| Fluid 2 | + | + | + | + | + | 0 | 0 |
| Fluid 4 | − | 0 | − | 0 | + | 0 | 0 |
| LUBRIZOL 52[3] | | | | | | | |
| Fluid 2 | + | + | 0 | 0 | 0 | 0 | 0 |
| LUBRIZOL 677A[4] | | | | | | | |
| Fluid 2 | 0 | + | 0 | − | − | − | − |
| LUBRIZOL 850[5] | | | | | | | |
| Fluid 2 | 0 | 0 | 0 | 0 | 0 | + | 0 |
| Fluid 4 | − | 0 | − | − | 0 | 0 | + |
| LUBRIZOL 5391[6] | | | | | | | |
| Fluid 2 | − | 0 | + | 0 | 0 | 0 | 0 |
| Fluid 4 | − | 0 | − | 0 | 0 | 0 | + |
| LUBRIZOL 5530[7] | | | | | | | |
| Fluid 4 | − | 0 | − | − | 0 | 0 | + |
| LUBRIZOL 5991[8] | | | | | | | |
| Fluid 2 | 0 | + | 0 | 0 | 0 | − | 0 |
| LUBRIZOL 8151[9] | | | | | | | |
| Fluid 4 | − | − | − | − | 0 | 0 | + |
| MOBILAD C603[10] | | | | | | | |
| Fluid 4 | − | 0 | 0 | − | 0 | 0 | + |
| Additive Z[11] | | | | | | | |
| Fluid 2 | + | 0 | + | − | 0 | + | − |

Note:
"+" indicates significant improvement as compared to the comparative microemulsion without oil-soluble additive (fluid 2 or 4)

TABLE IIIa-continued

MICROEMULSIONS WITH VARIOUS OIL-SOLUBLE INHIBITORS
Relative Specimen Weight Loss as Compared to Fluid 2 or 4
BASED UPON A 70% STATISTICAL CONFIDENCE INTERVAL
ASTM-D-1384 Glassware Test Results

| Oil Soluble Additive | Mod | Cu | ASTM | Br | St | C. Fe | Al |
|---|---|---|---|---|---|---|---|

"0" indicates a result comparable to the comparative microemulsion.
"−" indicates significant detriment as compared to the comparative microemulsion.

FOOTNOTES TO TABLES III AND IIIa

[1]INLAND 07 - This product is a mixture of petroleum aliphatic hydrocarbons and a hindered phenol antioxidant. It is recommended for corrosive applications at extreme pressures (wear) and elevated temperatures. It is a product of Inland Corporation and has the structural formula:

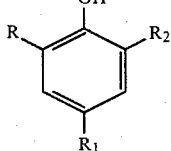

R, R$_1$, R$_2$ = ?

[2]INLAND 21 is a mechanical vacuum pump fluid that is designed to resist oxidation and decomposition, especially when exposed to reactive or corrosive species. This product is a mixture of petroleum alliphatic hydrocarbons and a hindered phenol antioxidant. It is a product of Inland Corporation.

[3]LUBRIZOL 52 - A low base number (24) calcium sulfonate to provide antirust and detergency properties. Recommended for hydraulics, metalworking and preservative oils. Excellent antirust performance. It is a product of Lubrizol Corporation.

[4]LUBRIZOL 677A - A secondary alkyl zinc dithiophosphate antiwear agent. Provides enhanced oxidation inhibition and antiwear protection. Recommended for hydraulic, gear and water based fluids. It is a product of Lubrizol Corporation and has the structural formula:

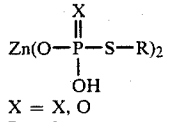

X = X, O
R = ?

[5]LUBRIZOL 850 - An alkylated organic acid rust inhibitor. Recommended for turbine, hydraulic, gear, metal working and preservative fluids. Imparts excellent antirust protection and has a minimum effect on the lubricant's other properties. It is a product of Lubrizol Corporation.

[6]LUBRIZOL 5391 - An oil soluble corrosion inhibitor for soluble oil systems and preservative oils. Can be used to formulate soluble oils to inhibit ferrous corrosion. Does not adversely affect emulsion stabilities. It is a product of Lubrizol Corporation.

[7]LUBRIZOL 5530 - Properties: Anticorrosion protection of ferrous and non-ferrous metals; lubrication properties; penetration qualities; moisture displacement. An antirust and penetrant lubricant for general purpose use in home, business and factory. It is a product of Lubrizol Corporation.

[8]LUBRIZOL 5991 - A neutral calcium sulfonate

TABLE IIIa-continued
MICROEMULSIONS WITH VARIOUS OIL-SOLUBLE INHIBITORS
Relative Specimen Weight Loss as Compared to Fluid 2 or 4
BASED UPON A 70% STATISTICAL CONFIDENCE INTERVAL
ASTM-D-1384 Glassware Test Results

| Oil Soluble Additive | Mod | Cu | ASTM Br | St | C. Fe | Al |
|---|---|---|---|---|---|---| rust inhibitor. Recommended for hydraulic oils. Exhibits excellent demulsibility and filterability characteristics. Outstanding thermal stability. It is a product of Lubrizol Corporation.

[9]LUBRIZOL 8151 - A gasoline-fuel additive for rust prevention. Recommended treatment levels range for 12 to 80 ppm. This rust inhibitor is a non-phosphorous, ash-free, detergent additive (of unknown composition) for gasoline to clean carburetors, protect product pipelines and storage tanks. it is a product of Lubrizol Corporation.

[10]MOBILAD C-603 - is an ashless rust inhibitor which has demonstrated excellent performance in hydraulic fluids and industrial circulating oils. Concentrations of 0.05% to 0.15% weight in such products have been sufficient to pass the ASTM D655 rust test. This product is a mixture of the active ingredient, a succinic anhydride amine derivative, in refined mineral oil. It is a product of Mobil Corporation and has the structural formula:

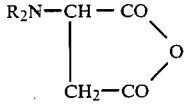

[11]Additive Z is an oil-soluble liquid corrosion inhibitor for copper brass, bronze and copper alloys. Under certain conditions it can also improve the performance of other corrosion inhibitors for other metals. This material is a 50% solution of 5-dodecylbenzotriazole in mineral oil and is effective in systems handling functional petroleum fluids such as hydraulics, brake fluids, lubricating oils, transmission oils and greases.

The results as shown in Table III (mg. wt. loss) and Table IIIa (relative corrosion inhibition compared to Fluid 2 or 4) above indicate that very few of the tested oil-soluble corrosion inhibitor provide improved corrosion inhibition results for the various metals tested, as compared to the aqueous microemulsion-containing antifreeze without oil-soluble inhibitor. The best corrosion inhibition was provided by the azole compound. Additive Z.

While this invention has been described with reference to certain specific embodiments, it will be recognized by those skilled in this art that many variations are possible without departing from the scope and spirit of the invention and that it is intended to cover all changes and modifications of the invention disclosed herein for the purposes of illustration which do not constitute departure from the spirit and scope of the invention.

I claim:

1. An oil-in-alcohol microemulsion-containing antifreeze composition concentrate having a discontinuous phase and a continuous phase comprising:
   (a) at least one alcohol in an amount sufficient to form a continuous phase in the concentrate;
   (b) alcohol-insoluble oil particules forming a discontinuous phase in said composition, said particles having a particle size less than about 0.1 micron;
   (c) at least one hydrophobizing compound selected from the group consisting of organic derivatives of the following: phosphate, sulfate, phosphonate, sulfonate, carboxylate, ammonium and phosphonium salts, amine oxides, phosphine oxides, amphoteric and zwitterionic groups, succinates, and mixtures thereof wherein the organic group is selected from the class consisting of the following radicals: alkyl, alkenyl, alkynyl, aryl, alkrayl and arylalkyl all having up to 24 carbon atoms, alkyleneoxy, polyalkyleneoxy, and combinations thereof;
   (d) at least one emulsifier present in an amount of from zero up to an amount sufficient to stabilize the microemulsion in the composition; and
   (e) at least one oil-soluble corrosion inhibitor, in a corrosion-inhibiting effective amount, said oil-soluble corrosion inhibitor being selected from the group consisting of azole compounds, phenol compounds, imidazoline compounds, succinic acid esters and partial esters, amino acid derivatives, glycerol ethers, benzimidazoles, oxazolium hydroxides, acyl glycine oxazolines, N-subsituted hydropyrimidine derivatives, amino-triazole derivatives, hydrocarbyl alkoxy amino alkylene-substituted asparagines, poly(oxyalkylated) hydrazine thiourea derivatives, nitro compounds, nitrogen and sulfur heterocylic compounds, sulfur-bridged hydrocarbon ring compounds casein sulfonate, organic acid salts of carboxylate-containing compounds, aminosuccinate derivatives and petroleum oxidates, and mixtures thereof.

2. The concentrate of claim 1 wherein said oil-soluble corrosion inhibitor is selected from the group consisting of azole compounds, phenol compounds, imidazoline compounds, substituted succinic acids and esters and partial esters thereof, amino acid derivatives, and mixtures thereof.

3. The concentrate of claim 1 wherein said emulsifier provides a cloud point for the antifreeze between 40° C. and 125° C.

4. The concentrate of claim 1 wherein said alcohol is selected from the group consisting of ethylene glycol, propylene glycol, diethylene glycol, dipropylene glycol, and mixtures thereof.

5. The concentrate of claim 1 wherein said oil particles are present in an amount of between about 0.001 and about 5 wt. percent based on the total weight of the microemulsion, and wherein said emulsifier is present in an amount of between about 0.1 times and about 100 times the total weight of said oil particles in the microemulsion, and wherein said alcohol is present in an amount of at least about 50 wt. percent based on the weight of the concentrate, and wherein the hydrophobizer is present in an amount of between about 0.001 and about 30 weight percent based on the weight of the microemulsion, with the proviso that the total weight of the concentrate not exceed 100 wt. percent.

6. The concentrate of claim 1 wherein said emulsifier consists essentially of non-ionic, anionic or cationic surfactants, or mixtures thereof.

7. The concentrate of claim 1 wherein said emulsifier consists of at least one non ionic surfactant.

8. The concentrate of claim 1 wherein said insoluble particles have an average particle size of less than about 0.05 microns.

9. The concentrate of claim 1 wherein component (c) is a propylene oxide or ethylene oxide/propylene oxide containing organophosphate ester.

10. The concentrate of claim 9 wherein said organophosphate ester has an average molecular weight below about 10,000.

11. The concentrate of claim 1 wherein component (c) is an organophosphate ester having the structural formula:

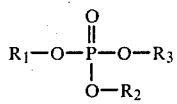

wherein each substituent $R_1$, $R_2$, and $R_3$ is selected from the class consisting of the following radicals: hydrogen; alkyl, aryl, alkenyl alkynyl, alkaryl and arylalkyl, with each of the foregoing having up to about 24 carbon atoms; alkyleneoxy, polyalkyleneoxy; phosphate or polyphosphate or their salts; and combinations thereof; with the proviso that at least one of said substituents is an organic radical within the class listed above or combinations thereof.

12. The concentrate of claim 1 wherein component (c) is an organophosphate ester identified by structural formulae I to III, including the free acids and salts thereof, together with mixtures thereof:

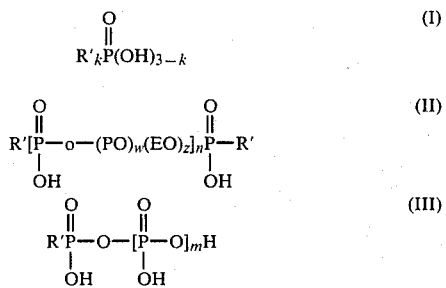

wherein
$R' = [RO(PO)_x(EO)_y]$ wherein R=H or alkyl, aryl, alkenyl, alkynyl alkylaryl or, arylalkyl having up to 24 carbon atoms
PO = propylene oxide radical
EO = Ethylene oxide radical
x = 1 to 100
y = 0 to 100
k = 1 to 3, with the proviso that k can be 3 if at least one R' group is removed from the phosphate ester by hydrolysis prior to, or during, use
n = 1 to 100
w = 0 to 100, with the proviso that if $w \geq 1$; then x can be zero
z = 0 to 100
m = 1 to 10.

13. The concentrate of claim 1 having a pH of between about 5.5 and about 11.

14. The concentrate of claim 1 which additionally contains silicate in a corrosion inhibiting effective amount.

15. The concentrate of claim 1 which additionally contains an antifoam additive in an amount effective to minimize foaming of said concentrate.

16. The concentrate of claim 1 wherein said oil particles are present in an amount of between about 0.1 and about 3 wt. percent based on the total weight of the microemulsion, and wherein said emulsifier is present in an amount of between about 0.5 times and about 50 times the total weight of said oil particles in the microemulsion, and wherein said alcohol is present in an amount of at least about 90 wt. percent based on the weight of the concentrate, and wherein the hydrophobizer is present in an amount of between about 0.005 and about 1 weight percent based on the weight of the microemulsion, with the proviso that the total weight of the concentrate not exceed 100 wt. percent.

17. A method of using the concentrate of any of claims 1 to 16 which comprises diluting the concentrate with water or a mixture of water and alcohol to make a working antifreeze and adding said working antifreeze to an automobile cooling system.

18. An antifreeze composition comprising the concentrate of any of 1 through 16, and additionally containing water and/or alcohol in an amount sufficient to provide a diluted antifreeze having a pH of between about 8 and about 11.

19. The concentrate of any of claims 1 through 16 which additionally contains a defoamer in a foam inhibiting effective amount.

20. The concentrate of claim 1 wherein said oil particles are present in an amount of between about 0.001 and about 5 wt. percent based on the total weight of the microemulsion.

21. The concentrate of claim 1 wherein said emulsifier is present in an amount of between about 0.1 times and about 100 times the total weight of said oil particles in the microemulsion.

22. The concentrate of claim 1 wherein said alcohol is present in an amount of at least about 50 wt. percent based on the weight of the concentrate.

23. The concentrate of claim 1 wherein the hydrophobizer is present in an amount of between about 0.001 and about 30 weight percent based on the weight of the microemulsion.

24. The concentrate of claim 1 wherein said oil particles are present in an amount of between about 0.1 and about 3 wt. percent based on the total weight of the microemulsion.

25. The concentrate of claim 1 wherein said emulsifier is present in an amount of between about 0.5 times and about 50 times the total weight of said oil particles in the microemulsion.

26. The concentrate of claim 1 wherein said alcohol is present in an amount of at least about 90 wt. percent based on the weight of the concentrate.

27. The concentrate of claim 1 wherein the hydrophobizer is present in an amount of between about 0.005 and about 1 weight percent based on the weight of the microemulsion.

28. The concentrate of claim 1 wherein component (c) is an alkyl or an alkynyl substituted succinate, or a mixture thereof.

* * * * *